United States Patent
Ramesh et al.

(10) Patent No.: US 12,530,714 B2
(45) Date of Patent: Jan. 20, 2026

(54) LOCATION-BASED DATA TRACKING FOR DYNAMIC DATA PRESENTATION ON MOBILE DEVICES

(71) Applicant: PayPal, Inc., San Jose, CA (US)

(72) Inventors: Venkatesh J. Ramesh, Madurai (IN); Rajkumar Baskaran, Vellore (IN)

(73) Assignee: PAYPAL, INC., San Jose, CA (US)

( * ) Notice: Subject to any disclaimer, the term of this patent is extended or adjusted under 35 U.S.C. 154(b) by 87 days.

(21) Appl. No.: 18/522,219

(22) Filed: Nov. 28, 2023

(65) Prior Publication Data

US 2024/0212029 A1    Jun. 27, 2024

Related U.S. Application Data

(63) Continuation of application No. 17/514,408, filed on Oct. 29, 2021, now Pat. No. 11,861,684, which is a continuation of application No. 16/667,829, filed on Oct. 29, 2019, now Pat. No. 11,188,974.

(51) Int. Cl.
| | |
|---|---|
| *G06Q 30/0201* | (2023.01) |
| *G06Q 20/32* | (2012.01) |
| *G06Q 30/0601* | (2023.01) |
| *H04W 4/021* | (2018.01) |
| *H04W 4/029* | (2018.01) |

(52) U.S. Cl.
CPC ....... *G06Q 30/0641* (2013.01); *G06Q 20/322* (2013.01); *G06Q 20/3223* (2013.01); *G06Q 30/0201* (2013.01); *H04W 4/021* (2013.01); *H04W 4/029* (2018.02)

(58) Field of Classification Search
None
See application file for complete search history.

(56) References Cited

U.S. PATENT DOCUMENTS

| | | |
|---|---|---|
| 8,688,083 B2 | 4/2014 | Colligan et al. |
| 8,752,118 B1 | 6/2014 | Davis et al. |
| 8,849,710 B2 | 9/2014 | Moghadam et al. |

(Continued)

FOREIGN PATENT DOCUMENTS

WO    2012121950 A1    9/2012

OTHER PUBLICATIONS

PRNewswire., "FieldEdge Partners With LeadsNearby to Improve Customer Engagement Efforts," New York, Mar. 2, 2018, 2 pages.

(Continued)

*Primary Examiner* — Nicholas D Rosen
(74) *Attorney, Agent, or Firm* — Haynes and Boone, LLP

(57) ABSTRACT

There are provided systems and methods for location-based data tracking for dynamic data presentation on mobile devices. A user's device may be used to track user data for the user, including locations visited by the user and activities by the user at the locations. These may be correlated to likely behavior by the user at the location so that a predicted activity by the user at a location may be determined. Thus, when a user visits a location, the predicted activity of the user at the location may be determined. Using the predicted activity, application data for an application may be generated and may be dynamically presented through one or more interfaces of the user's device. This may be presented without user input at the location so that the user may quickly perform the activity through the user's device.

18 Claims, 6 Drawing Sheets

(56) References Cited

U.S. PATENT DOCUMENTS

| | | |
|---|---|---|
| 9,665,865 B1 | 5/2017 | Xing et al. |
| 10,019,732 B2 | 7/2018 | Morse et al. |
| 10,026,099 B1* | 7/2018 | Joshi ................ G06Q 30/0261 |
| 10,078,700 B2 | 9/2018 | Vaidyanathan |
| 10,176,499 B2 | 1/2019 | Deluca et al. |
| 10,185,948 B2 | 1/2019 | Kumaraguruparan et al. |
| 10,223,674 B2* | 3/2019 | Itwaru ................ G06Q 20/102 |
| 10,387,882 B2 | 8/2019 | Hagen et al. |
| 10,410,272 B1* | 9/2019 | Johnson ............ G06Q 30/0633 |
| 10,430,832 B2 | 10/2019 | Filatoff |
| 10,521,821 B2 | 12/2019 | DeWitt et al. |
| 10,552,920 B2* | 2/2020 | Todasco ................ G06Q 50/01 |
| 10,579,985 B2 | 3/2020 | Laracey et al. |
| 10,733,631 B2* | 8/2020 | Flowers ............ G06Q 30/0261 |
| 10,861,049 B2 | 12/2020 | Dun |
| 10,878,477 B2 | 12/2020 | Narasimhan et al. |
| 10,884,547 B2 | 1/2021 | Klein et al. |
| 11,093,971 B2* | 8/2021 | Kurian ................ G06F 16/9538 |
| 11,106,324 B2* | 8/2021 | Tiwari ................ G06F 3/0481 |
| 11,188,974 B2 | 11/2021 | Ramesh et al. |
| 11,488,189 B2* | 11/2022 | Rodriguez Bravo ........................ G06Q 30/0226 |
| 11,861,684 B2* | 1/2024 | Ramesh ............ G06Q 20/322 |
| 2004/0261010 A1* | 12/2004 | Matsuishi .......... H04N 1/00233 715/236 |
| 2007/0174115 A1 | 7/2007 | Chieu et al. |
| 2010/0130179 A1 | 5/2010 | Colligan et al. |
| 2012/0123891 A1 | 5/2012 | Patel |
| 2012/0158654 A1 | 6/2012 | Behren et al. |
| 2013/0060623 A1 | 3/2013 | Walker et al. |
| 2013/0173433 A1 | 7/2013 | Moghadam et al. |
| 2013/0212004 A1* | 8/2013 | Itwaru ................ G06Q 20/0855 705/39 |
| 2014/0289047 A1 | 9/2014 | Yee et al. |
| 2015/0095216 A1* | 4/2015 | Van Heerden ......... G06Q 30/00 705/39 |
| 2015/0201029 A1 | 7/2015 | Vaidyanathan |
| 2015/0221016 A1 | 8/2015 | Schulz et al. |
| 2015/0287017 A1 | 10/2015 | Iqbal et al. |
| 2016/0210682 A1 | 7/2016 | Kannan et al. |
| 2016/0224965 A1* | 8/2016 | Chauhan .............. G06Q 20/227 |
| 2016/0247197 A1 | 8/2016 | Morse et al. |
| 2016/0328698 A1 | 11/2016 | Kumaraguruparan et al. |
| 2016/0343032 A1 | 11/2016 | DeWitt et al. |
| 2017/0004487 A1 | 1/2017 | Hagen et al. |
| 2017/0098210 A1 | 4/2017 | Laracey et al. |
| 2017/0140366 A1 | 5/2017 | Xing et al. |
| 2017/0161846 A1* | 6/2017 | Todasco ............ G06Q 30/0215 |
| 2017/0193584 A1 | 7/2017 | Narasimhan et al. |
| 2017/0270565 A1 | 9/2017 | Filatoff |
| 2017/0323345 A1* | 11/2017 | Flowers ............ G06Q 30/0269 |
| 2018/0040020 A1* | 2/2018 | Kurian ................ G06F 16/9535 |
| 2018/0130096 A1 | 5/2018 | Dun |
| 2018/0329718 A1 | 11/2018 | Klein et al. |
| 2018/0330406 A1 | 11/2018 | Deluca et al. |
| 2019/0057374 A1 | 2/2019 | Hernandez-Ellsworth et al. |
| 2019/0180297 A1* | 6/2019 | Bhatia ................ G06Q 30/0206 |
| 2019/0213242 A1 | 7/2019 | Pathak et al. |
| 2020/0167814 A1* | 5/2020 | Rodriguez Bravo ........................ G06Q 30/0209 |
| 2020/0201920 A1* | 6/2020 | Tiwari ................ G06F 3/0481 |
| 2020/0387214 A1* | 12/2020 | Ravasz ................ G06F 3/011 |

OTHER PUBLICATIONS

Spann M., et al., "Tell Me Where You Are and I'll Tell You What You Want: Using Location Data to Improve Marketing Decisions," GfK Marketing Intelligence Review, vol. 8.2: 30-37, De Gruyter Poland, Nov. 2016, 6 pages.

* cited by examiner

LOCATION-BASED DATA TRACKING FOR DYNAMIC DATA PRESENTATION ON MOBILE DEVICES

CROSS-REFERENCE TO RELATED APPLICATIONS

This application is a continuation of U.S. patent application Ser. No. 17/514,408, filed Oct. 29, 2021, which is a continuation of U.S. patent application Ser. No. 16/667,829, filed on Oct. 29, 2019, now U.S. Pat. No. 11,188,974, the disclosures of which are incorporated herein by reference in their entirety.

TECHNICAL FIELD

The present application generally relates to tracking patterns of location-based data and more particularly to predicting specific content to output on mobile devices based on past patterns in location-based data of a user.

BACKGROUND

During a course of a time period, such as over a month or a year, a user may conduct routine activities during their daily or weekly schedules. This may include visiting particular locations and engaging in electronic transaction processing using mobile devices at those locations. Mobile devices may provide several functionalities to users at these locations and may be helpful for engaging in particular activities at these locations. For example, a mobile device may include an application that allows the user to perform electronic transaction processing to provide a digital payment to a user or merchant at the location. Other mobile applications may be associated with messaging, biometric tracking (e.g., for fitness), media posting and/or viewing, social networking, and the like. However, in order to utilize these application functionalities, a user may be required to navigate multiple menus and/or locate application processes, which may be tedious and time consuming. Thus, mobile devices do not provide optimized usage of applications at specific locations for user needs.

Figure 1:
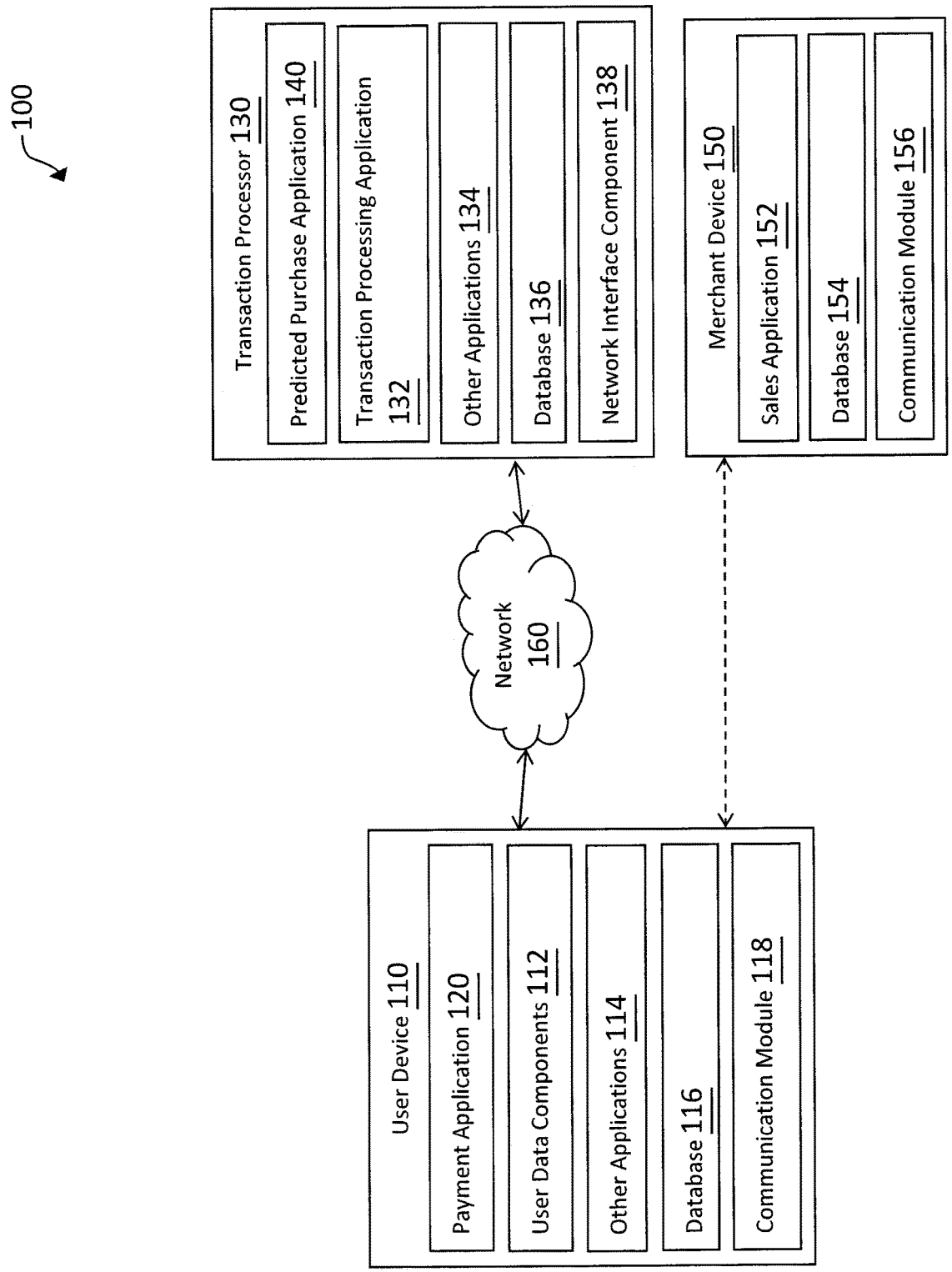
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for location-based data tracking for dynamic data presentation on mobile devices. Systems suitable for practicing methods of the present disclosure are also provided.

A user's device, such as a mobile computing device, may be used to track user data over a period of time and correlate the data to particular activities the user performs at particular locations. Utilizing this data, a service provider may cause the device to perform some operation and/or dynamically present data and/or executable processes to the user through the device, which may include electronic transaction processing, messaging, and other types of data loading and processing. The application data loading and processing may then be performed without or with minimal user interaction and input so as to minimize user input and time spent navigating mobile application interfaces and processes and thus decrease computing usage and saving battery power, while increasing user experience with the mobile device. Moreover, the device may be automatically triggered to capture data, locations, and/or other detectable data (e.g., inputs and other application or user activities at a location) to update data tracking information and user patterns in order to better generate and present data to the user through the user's device. Therefore, the user does not need to particularly activate a device, enter input, and/or execute applications and processes, thereby freeing the user to perform other actions at the location.

In order to provide predicted application and/or user interface data or content to a user's device at a specific geo-location of the user, a service provider, such as an online transaction processor, may track user data and activities over a period of time. In other embodiments, the processes described herein may also be provided on the user's device, such as mobile smart phone. The tracked data may correspond to location data of a user, including visited geo-locations (e.g., detected through a GPS tracker or component of the user's device) and movements throughout geo-locations or geo-fenced areas. The locations may be matched to particular geo-fenced areas, such as a geo-fenced area for a merchant, retail location, or other entity's location. The tracked data may include activity data of the user, such as completed transactions of the user, abandoned or incomplete transactions, or content viewed or searched at the past visited locations. The activity data of a user may also correspond to other user data that can be monitored and/or tracked at locations, such as biometrics (heart rate, perspiration, retinal information, etc.), user device usage (e.g., application usage, including electronic transaction processing, messaging, social networking, microblogging, etc.), and/or use of other devices, vehicles, or components at locations.

Additionally, activity data and/or locations visited by a user may be determined by scraping or retrieving data from an online resource, such as a social networking account of the user. In some embodiments, the activity data may correspond to or instead include other data of the user that is determined from online activities, device activities or input, and/or other types of information determined from the user's interactions, input, or information with respect to a computing device or online resource. For example, other data for the user may correspond to search activity, search queries, and/or search results for the user performed with an online search engine or resource. The other data may correspond to items added to shopping lists or wish lists input by the user with a device application or online merchant marketplace. Additionally, other data of a user's activities or potential item purchases may include preferences set with an application or online resource, such as interests in items and/or item price or availability notices. The other types of activity data may be scraped from online activity of the user, such as likes of items, images, or other users, social networking or microblogging posts, and the like. The particular user activities may then be correlated to the location by determining what activities occurred at which locations and generating correlations between the two. Thus, the online service provider may include a repository or database of one or more user's activities at particular locations tracked over a period of time. This time period may be daily, weekly, monthly, yearly, or for another particular period of time.

This data is used to determine predicted activities and potential purchases at a location by determining particular repeated activities at locations, such as electronic transaction processing for past transactions or other activities that may be engaged in by a user. For example, if a user visits an ice cream shop every Monday and Friday at 2 PM to purchase a scoop of ice cream, these past transactions of the user may be correlated to that location when the user visits at the same (e.g., Monday and Friday) or similar times (Weekdays). Similarly, if the user visits a park to run every Saturday, which may be detected from biometrics, fitness trackers, and/or social networking posts of the user, similar behavior may be correlated to that particular activity at that location. In order to determine these repeated behaviors, the correlation data of the user's locations to activities may be processed to determine these repeated activities. In some embodiments, those activities that occur a certain number of times or a certain percentage of time (e.g., exceeding a threshold number or percentage) at a particular location are identified as repeated activities for those locations. In other embodiments, a scoring engine may be implemented to score repeated transactions based on time of occurrence, number of repetitions, the same or similar locations, or another factor. A score of a recurring activity may be required to exceed a threshold to identify the activity as a repeated activity for a location. Additional data may also be accessed and used to determine if an activity is a repeated activity or score a particular repeated activity, such as online or web activity (e.g., search engine searches, social networking, microblogging, messaging, etc.), a shopping list of the user, a budget of the user, needs of the user based on activity monitoring, and the like.

The user's device may further include additional components that may capture this data, such as a GPS locator or other location detection component that may determine a geo-location of the device. The device may also include a compass functionality or other application or instrument for navigation. Additionally, the device may include a microphone and audio recording process, as well as an audio processing feature to process voice input, such as a voice-to-text process. The device may also include a transceiver that may allow for wireless communications with one or more other devices or servers, including over cellular communications (e.g., 3G, 4G, 4G Long Term Evolution (LTE), 5G, other $3^{rd}$ Generation Partnership Project (3GPP)-based cellular communications), or other types of wireless communications.

Thus, a location of a user may be detected at a time and a predicted purchase or other activity of the user may be determined based on this user information of repeated activities of the user. In this regard, if the user visits a particular location (e.g., the ice cream shop in the previous example), then a predicted activity of the user may be determined based on the past activities of the user at that location. For example, in the ice cream shop example, when the user visits that location, the service provider may determine a predicted purchase for a scoop of ice cream. This may also be time dependent, such that the predicted purchase is determined for the specific time of the previous activities (e.g., on Monday and Friday for ice cream purchases in the previous example). Thus, the service provider may correlate the user's repeated past transactions to particular locations so that a predicted purchase by the user may be determined when the user visits a location. In some embodiments, other potential activities of the user may be determined, such as an action, processes, or input a user may perform with the user's mobile device (e.g., posting of data, such as an image, to social networking platforms, messaging a friend, looking up data, providing a ticket or other access credential, connecting with another device or network, and the like). Activities can be tracked and correlated even if the user visits different locations, such as when the different locations all correspond to a similar merchant type, e.g., coffee shops at different locations. In that case, even when the user visits a location (geo-location) the user has never been before, but is known to be a location of a coffee store, a predicted purchase or activity can be obtained from a pattern of purchases or activities at other locations associated with coffee shops.

In further embodiments, additional data may be used to determine the predicted purchase. For example, the predicted purchase may be based on additional data for the user, including the aforementioned online or web activity (e.g., search engine searches, social networking, microblogging, messaging, etc.), a shopping list of the user, a budget of the user, needs of the user based on activity monitoring, and the like. For example, web searches by the user may be used to determine whether a user is interested in an item, and cross-reference that item to inventory and/or available items at the current geo-location of the user. Similarly, the user may enter a shopping list to an application on the user's device, which may be cross-referenced to the location and available items at the location. The needs of the user may be determined based on spending patterns of the user, such that recent transactions, budgets, and/or account/credit balances may be used to determine whether the user is likely to accept or engage in a predicted purchase at a location. For example, if the user has recently purchased a new suit but not dress shoes, but then the user visits a shoe store, a predicted purchase of the same or similar dress shoes the user has previously purchased may be determined. In contrast, if the user has a budget of $1,000 a month to purchase of clothes and has recently met or exceeded that budget, a predicted purchase for clothes may not be determined for the user's current location even if it matches past user purchases or additional information indicating a potential purchase by the user at the location. The user may set the budget with the service provider or the budget may be determined based on user financial information for the user, such as income, expected assets and/or debts, bills, and the like.

The predicted purchase may also be based on correlating other users' tracked data (e.g., locations and activities) to particular locations of the user. For example, sales data by the merchant, such as popular items purchased by the other users at the location of the user, may be used to determine a predicted purchase by the user at the location. This may assist in providing potential purchases to the user when the user visits a new location or if the user would be interested in favorite or popular items at a merchant location. Thus, the additional data for the predicted purchase may include spending patterns by the user and/or other users at the user's geo-location. The additional data may also include an outside temperature and/or weather pattern or upcoming weather associated with the user's geo-location or another location the user is expected to visit later. For example, if the user typically purchases ice cream from the ice cream shop during summer months or on days exceeding a certain temperature, then the predicted purchase may be determined for those days or visits to the geo-location having the same or similar weather. Additionally, repeated past transactions may also be correlated to each other to determine other predicted purchases and/or alert the user or another entity of the correlated past transactions. For example, if the user consistently buys digestive relief medication after eating spicy food, a predicted purchase of the medication may be determined. Further, the user and/or a medical professional associated with the user may be alerted of the similar purchases.

As previously discussed, the predicted purchase may be determined when real-world data or other information at the user's geo-location indicates that the user is likely to engage in the purchase. However, additional data may also indicate that a predicted purchase is not to be offered to a user, such as exceeding a budget of the user, purchasing something that may adversely affect the user's health, purchasing something in an adverse weather period or other real-world event, a merchant lacking inventory, and/or another location offering a better, more highly reviewed, or more commonly purchased item. When determining the predicted purchase, the user's location, activity data, additional data, and/or other users' data may be individual or collectively scored to determine if a predicted purchase exceeds a threshold score or requirement. In this regard, the various factors may include different weights that affect the scoring of particular data at a location to determine a predicted purchase for a user.

In response to determining a predicted purchase for a user, the service provider (or on-device application, such as a resident application that provides similar functionality to the service provider) may dynamically generate application data, an interface selectable option, and/or an executable process for an application on the user's device that allows the user to complete the predicted purchase is a simple manner, such as through a single click of a menu option or the like. This data may be automatically presented and populated in an application and/or user interface of the device. This may be done without a user input or request at the location so that the user does not need to provide input or navigate menus to perform electronic transaction processing for the predicted purchase. In some embodiments, the user may opt-in to a process to allows for this automatic generation and population of predicted purchase processing data and option. In other embodiments, other types of activities may be predicted, and other types of data may be generated. For example, a message to another user or a social networking post may be automatically generated and provided to the user based on the user's expected or predicted activity at the location.

The data for the predicted purchase may, in some embodiments, correspond to application data that may be automatically filled in one or more application fields, menus, or other input elements that allow for the user to process the predicted purchase. For example, an item name or identifier, cost, tax, and/or tip may be automatically entered to a transaction processing operation and/or interface of a payment application. In some embodiments, an interface element, corresponding to an executable process that may be executed and completed, may be generated and dynamically provided within a user interface. In some embodiments, a push notification, pop-up, or another message may be generated that allows for engaging in processing of the predicted purchase. The interface element may correspond to a selectable option, menu, or other displayable graphical element within an interface of the computing device, such as an operating system graphical user interface (GUI) or an application interface. The interface element may be specifically generated for the predicted purchase, such as an interface notification that displays information for the predicted purchase and where selection of the predicted purchase may initiate an executable process to complete a purchase of the potential purchase. For example, a service provider or an application on the device may specifically generate the interface element for the particular item and location of the user. The interface element may be customized based on item, merchant, and/or location information and may correspond to a particular application, such as a payment or transaction processing application, that initiates a process to complete electronic transaction processing for the predicted purchase. The interface element may therefore correspond to both displayable data for the predicted purchase, as well as application process data used to process the predicted purchase through one or more executable application processes.

In some embodiments, the interface element may be pre-generated or correspond to a template interface element that may be loaded with particular information for the predicted purchase for display, such as an interface notification that includes an item name, amount, description, and/or fulfilling merchant. The interface element may be associated with an application process, such as an electronic transaction processing process, which may further be loaded with executable data for processing the predicted purchase. The generated interface element may then be displayed through a GUI of the user's computing device. For example, the interface element may be dynamically generated and then displayed through the GUI so that the user may view item information, merchant information, and other information about the predicted purchase so that the user may decide to accept or decline the predicted purchase. The interface element may also or instead correspond to a pop-up notification, banner, or other displayable element. The interface element may link to an application process that include pre-loaded data and displayable information for processing the predicted purchase through the corresponding application (e.g., a payment application). The interface element may be dynamically displayed based on the location of the user so that the user may interact with a nearby merchant to process the predicted purchase. The interface element may be displayed while the user is at the location or within the geo-fenced area, for example, on detection of the user at the location or entering the geo-fence. Moreover, movement of the user may change, remove, or otherwise alter display of the interface element. In this regard, if the user leaves the location or geo-fence, the interface element may be removed, hidden, or updated with a new predicted purchase based on the new location of the user. The interface element may also be displayed in a time-based manner, such as for an amount of time, or may be generally displayed, viewed, accepted, and/or dismissed by the user as a displayable notification on the GUI of the computing device.

Acceptance of the generated data for the predicted purchase may implement a process to communicate with a merchant device at the merchant location and/or the service provider to complete the purchase, for example, using a user account of the user. For example, selecting an accept option or portion of the interface element may initiate and/or complete processing of the predicted purchase. Once selected, details for electronic transaction processing of the predicted purchase may be displayed, including display of a payment instrument for processing a payment and/or allowing change of the payment instrument. The user may then complete electronic transaction processing through the application process, which may include communicating with the transaction processor and/or merchant device for processing. The option may also be declined, and another predicted purchase may be determined. The predicted purchase may be declined by selecting a decline option, closing the notification for the interface element and predicted purchase, and/or ignoring the interface element for the predicted purchase. Declining of the interface element may also be determined by the user moving to a new location without acceptance of the predicted purchase through the interface element. Based on the feedback for the predicted purchase, the user's tracked data for the location and activities may be updated for future determination of predicted purchases.

A user may pay for one or more transactions provided through this dynamically generated data for a predicted purchase using a digital wallet or other account with an online service provider or other transaction processor (e.g., PayPal®). An account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. In order to pay for the transaction (e.g., a transfer or payment to another user, merchant, or other entity), the user may provide user financial or funding source information or may login to an account with the service provider through authentication information and process the transaction using the account. A payment may then be issued to the other party to the transaction and transaction information may be stored with the digital wallet or account.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a transaction processor 130, and a merchant device 150 in communication over a network 160. User device 110 may be utilized by a user to capture and track data of a user's activities at locations, such as movements, electronic transaction processing, and other information at particular locations over a period of time. Transaction processor 130 may determine predicted purchases or other device activities of user device 110 at locations based on this tracked data. In response to the predicted purchase, transaction processor 130 may automatically generate and present data to the user through user device 110.

User device 110 and transaction processor 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented as a communication device that may utilize appropriate hardware and software configured for wired and/or wireless communication with transaction processor 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of user and/or vehicle devices may function similarly and/or be connected to provide the functionalities described herein.

User device 110 of FIG. 1 contains a payment application 120, user data components 112, other applications 114, a database 116, and a communication module 118. Payment application 120 and other applications 114 may correspond to executable processes, procedures, and/or applications with associated hardware. In other embodiments, user device 110 may include additional or different modules having specialized hardware and/or software as required.

Payment application 112 may correspond to one or more processes to execute software modules and associated components of user device 110 to process electronic transactions over a network with one or more other services and/or users, as well as view data of predicted purchases provided to the application by transaction processor 130 or generated by user device 110. In this regard, payment application 112 may correspond to specialized hardware and/or software utilized by a user of user device 110 that may be used to access a website or an interface of transaction processor 130 that allows user device 110 to enter or receive transaction data for a transaction (e.g., a payment to another entity, such as a user, merchant, or other payee, which may include data for a predicted purchase), provide an account, financial data, or a digital token used to pay for the transaction data, and instruct transaction processor 130 to perform transaction processing. Payment application 112 may utilize one or more user interfaces, such as graphical user interfaces presented using an output display device of user device 110, to enable the user associated with user device 110 to enter and/or view interface data, where the interface data may be customized and dynamically output based on data for predicted purchases by the user at a particular location based on their activities.

In some embodiments, payment application 112 may display data for a predicted purchase through an application interface, including a form or process to electronically process a transaction through payment application 112. Thus, payment application 112 may include an option to accept the predicted purchase or decline the predicted purchase through an interface element and dynamically generated data based on the user's location and activities. In other embodiments, payment application 112 may display information for a predicted purchase and the option to accept or decline the predicted purchase in another interface, such as a home screen or other operating system screen alert, push notification, pop-up, message, or the like. Thus, an interface of payment application 112 may include interface data and interface elements that allow for interaction with the provided data for a predicted purchase or activity. Such data may be determined by user device 110 and/or transaction processor 130, as discussed herein.

During transaction processing, payment application 112 may be utilized to select payment instrument(s) for use in providing payment for a purchase transaction, transfer, or other financial process. As discussed herein, payment application 112 may utilize user financial information, such as credit card data, bank account data, or other funding source data, as a payment instrument when providing payment information. Additionally, payment application 112 may utilize a digital wallet associated with an account with a payment provider, such as transaction processor 130, as the payment instrument, for example, through accessing a digital wallet or account of a user with transaction processor 130 through entry of authentication credentials and/or by providing a data token that allows for processing using the account. Payment application 112 may also be used to receive a receipt or other information based on transaction processing. This data may be shared with transaction processor 130 for use in determining transaction processing activities of user device 110 for completed transactions at certain locations.

In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 160, including retrieving website information (e.g., a website for transaction processor 130), presenting the website information to the user, and/or communicating information to the website, including payment information for a transaction processed through transaction processor 130. However, in other embodiments, payment application 112 may include a dedicated application of transaction processor 130 or other entity (e.g., a merchant), which may be configured to assist in processing transactions electronically.

User data components 112 correspond to one or more hardware and/or software features of user device 110 that assist in capturing data of a user associated with user device 110. In certain embodiments, user data components 112 may include a location detection component capable of detecting a location of user device 110, for example, through a GPS locator and service, triangulation process, mapping application, check-in process/feature, wireless communications, or other location detection process. Moreover, the location for user device 110 that may be determined by user data components 112 may be shared with, provided to, or utilized by transaction processor 130 when determining a predicted purchase. In various embodiments, user data components 112 may include a camera, which corresponds to an optical device of user device 110 enabling user device 110 to capture or record images, including still and/or video images. User data components 112 may correspond to a digital camera on user device 110 (e.g., incorporated in user device 110 such as a mobile phone's digital camera in a traditional camera orientation and/or a forward facing camera orientation that captures one or more users as they use and view a display screen of user device 110) or associated with user device 110 (e.g., connected to user device 110 but not incorporated within a body or structure of user device 110), or may more generally correspond to any device capable of capturing or recording an image, video, or other data conveying content, including infrared imaging or other types imaging devices. As a digital camera, user data components 112 may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of user data components 112 may include various features, such as zoom, flash, focus correction, shutter speed controls, or other various features usable to capture one or more images or videos of the user and/or other users or objects.

User data components 112 may include other media capture components, including a microphone to capture audio data. A microphone of user data components 112 may be used to capture voice data, which may be processed to determine activities of a user. User data components 112 may include biometric capture components, including those for heart rate, perspiration, retinal features, and the like. User data components 112 may further include a navigational component and/or application, such as a compass, as well as a gyroscope, accelerometer, or other component that may detect an orientation of user device 110. User data components 112 may include peripherals and/or attachable devices that may be connected through one or more ports or wired/wireless connections and used to capture data of a user. User data components 112 may also include software components that may interact with the hardware components to facilitate data determination, such as camera controllers.

In various embodiments, user device 110 includes other applications 114 as may be desired in particular embodiments to provide features to user device 110, including those with capturing activities of a user of user device 110 at a particular location. For example, other applications 114 may include security applications for implementing client-side security features, programmatic client applications for interfacing with appropriate application programming interfaces (APIs) over network 160, or other types of applications.

Other applications 114 may also include email, texting, voice and IM applications that allow a user to send and receive emails, calls, texts, and other notifications through network 160. Other applications 114 may also include other location detection applications, which may be used to determine a location for user device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display components capable of displaying information to users and other output components, including speakers.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with one or more application, identifiers associated with hardware of user device 110, or other appropriate identifiers, such as identifiers used for payment/user/device authentication or identification, which may be communicated as identifying the user/user device 110 to transaction processor 130. Moreover, database 116 may include stored location and/or activity data, as well as received data for presented predicted purchases at locations based on this tracked data of the user.

User device 110 includes at least one communication module 118 adapted to communicate with transaction processor 130, merchant device 150, and/or another nearby device within range of communication module 118. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using wireless communications, such as Bluetooth Low Energy, LTE Direct, WiFi, radio frequency, infrared, Bluetooth, and near field communications.

Transaction processor 130 may be maintained, for example, by an online service provider, which may provide prediction of potential purchases by a user associated with user device 110 based on tracked data and locations of user device 110, as well as transaction processing services. In this regard, transaction processor 130 includes one or more processing applications which may be configured to interact with user device 110 and/or another device/server to facilitate communications and transactions between users based on data captured of the users. In one example, transaction processor 130 may be provided by PAYPAL®, Inc. of San Jose, CA, USA. However, in other embodiments, transaction processor 130 may be maintained by or include another type of service provider.

Transaction processor 130 of FIG. 1 includes a predicted purchase application 140, a transaction processing application 132, other applications 134, a database 136, and a network interface component 138. Predicted purchase application 140, transaction processing application 132, and other applications 134 may correspond to executable processes, procedures, and/or applications with associated hardware. In other embodiments, transaction processor 130 may include additional or different modules having specialized hardware and/or software as required.

Predicted purchase application 140 may correspond to one or more processes to execute modules and associated specialized hardware of transaction processor 130 to determine predicted purchases for users based on tracked data of the users, such as locations of the users, activities of the users, and other additional data associated with the location, the specific user, or other users. In this regard, predicted purchase application 140 may correspond to specialized hardware and/or software to first track data of a user, such as the user of user device 110. This tracked data may include locations that the user visits over a period of time, including a time at which the user has visited the locations and movements between locations (e.g., visiting location A followed by location B or other pattern of movements of the user). In addition to visited locations, the tracked data may include activities of the user at the locations, including processed and completed transactions for one or more items, biometrics, device usage of user device 110, co-locating with other users, and other types of activities, such as content viewed or searched, messages sent, and the like. Tracked data may also include additional data of the user or associated with the location, including web activity of the user, a shopping list of the user, a budget or budgetary information set by the user or determined based on the user's accounts, bills, income, and the like, and/or needs of the user based on user information for the user (e.g., medication, another similar purchase such as batteries for electronics, and the like).

Once the tracked data has been determined over a time period, association and correlations between the locations and the activities of the user may be determined by predicted purchase application 140. For example, if the user often (purchases more than a threshold percentage of times while at a location) or always purchases items at a location, or the user always visits the location to message a friend, post to social media, or exercise, a correlation between a location and a likelihood of the activity occurring at the location may be generated by predicted purchase application 140. The activity may be required to occur a certain number or percentage of times at the location for a correlation to be made, or a scoring engine may be used to determine whether the activity exceeds a threshold score for likelihood of occurring at the location. If a correlation or association is made based on the past tracked user data of locations and activities, predicted purchase application 140 may determine a predicted or potential purchase for the user when the user is detected at a location, such as a purchase of one or more items that the user may potential complete at the location or a similar location (such as a merchant selling the same goods or services). The predicted purchase may be for a repeated or recurring transaction that the user previously completed at the location, or may be for a predicted purchase the user may want or need at the location (e.g., items on a shopping list, a need for the user based on other purchases or a search history, etc.). In some embodiments, the predicted activity may be different from a predicted purchase, such as a message, social networking interaction, media viewing experience, or other activity that the user may perform at the particular location. Additionally, other data may be used to determine the predicted purchase in addition or alternatively to the past activities of the user. For example, a search history, shopping or wish list, application activity or input, and/or item, merchant, and/or price preferences may be used to determine a predicted purchase for the user. In this regard, other available data may be retrieved, determined, or scraped from a device or online resource to determine the predicted purchase.

In response to determining the predicted purchase, predicted purchase application 140 may then generate application or device data for user device 110 to view the predicted purchase and complete a transaction for the purchase in a fast and streamlined manner through one or more device processes. For example, application data may correspond to data for payment application 120 that may be loaded to one or more application processes, forms, and/or interface elements so that the user may process a payment for the predicted purchase. An executable process may also be generated to complete the predicted purchase through an application, such as payment application 120. The executable process may be loaded to user device 110 so that the user may process the predicted purchase without entering data for the purchase, merchant, or user and/or navigating multiple application interfaces. Where the predicted activity is different than a predicted purchase, different application data may be generated, such as a message, a social networking interaction, available media, or other data for an application that may be used by the user.

An interface element and/or option for the executable process may be generated and populated within one or more interfaces of user device 110. In this regard, the interface element may be specifically generated for the user, location, and/or item based on detecting the location of the user and determining the predicted purchase. The dynamically generated interface element may therefore correspond to a notification, alert, or other displayable data that is presented through a GUI of user device 110 and include information for the item, merchant, and/or location that corresponds to the predicted purchase. The interface element may therefore display information to the user that allows the user to determine whether the user wants to complete the predicted purchase and purchase the corresponding item. The interface element may correspond to an application process that is used to complete processing of the predicted purchase through user device 110, such as an electronic transaction processing process of payment application 120. The interface element may be displayed dynamically based on the location of user device 120, and may further be dynamically updated, removed or changes based on changes to the location of user device 120, such as entering and/or exiting a geo-fence of a merchant, item, or other area. Additionally, the interface element may be specifically generated for the particular predicted purchase, for example, using an item image, information, price, merchant image or information, and/or location information, such as a graphical icon, notification, or other data. In other embodiments, interface elements for payment application 120 may be changed, updated or altered to account for the data for the predicted purchase, and may be displayed based on pre-generated or template interface elements for a specific application.

The interface element may be generated by predicted purchase application 140 prior to launching of payment application 120 and/or while payment application 120 operates in a background of user device 110 such that the interface element may be displayed through a GUI of user device 110 without requiring the user of user device 110 to specifically request the interface element for the predicted purchase and/or launch the application (or execute some process in the application to retrieve the interface element). In some embodiments, the interface element may also or instead correspond to a pop-up notification, banner notification, or other displayable interface information. Thus, the interface element may be displayed without opening payment application 120 or may be displayed when the user launches payment application 120. The interface element may be displayed and cause payment application 120 to launch or execute in a foreground of an operating system of user device 110. The interface element may cause an executable process to initiate or be displayed with the data in the executable process for processing the predicted purchase. For example, data necessary to complete a purchase of the item with the merchant corresponding to the predicted purchase may be used by the application to complete the predicted purchase. If the user accepts the option for the predicted purchase, transaction processing application 132 may be used to process a transaction for the predicted purchase. An executable process may be initiated within an application on user device 110 (e.g., payment application 120) that uses data for the predicted purchase to complete electronic transaction processing for the predicted purchase. The executable process may be loaded with data from or corresponding to the interface element, such as item, merchant, price, payment instrument, and/or location data. Transaction processing application 132 may receive the acceptance, and may utilize the data from the executable process to complete electronic transaction processing for the predicted purchase. Additionally, based on accepting or declining the predicted purchase, the tracked data of the user may be updated.

Transaction processing application 132 may correspond to one or more processes to execute modules and associated specialized hardware of transaction processor 130 to process a transaction for a predicted purchase accepted through payment application 120. In this regard, transaction processing application 132 may correspond to specialized hardware and/or software used by a user associated with user device 110 to establish a payment account with transaction processing application 132 by providing personal and/or financial information to transaction processor 130 and selecting authentication credentials. In various embodiments, the financial information may include payment instrument information, such as account/card numbers and information. The account may be used to send and receive payments. The payment account may be accessed and/or used through a browser application and/or dedicated payment application executed by user device 110, such as payment application 120.

In some embodiments, predicted purchase application 140 may generate transaction data for user with merchant device 150, and may communicate with transaction processing application 132 to provide the transaction data to user device 110 when user device 110 is detected at a merchant location for merchant device 110. Thus, transaction processing application 132 may interact with predicted purchase application 140 and/or merchant device 150 (e.g., through one or more API calls to APIs of predicted purchase application 140 and/or merchant device 150). In other embodiments, predicted purchase application 140 may generate and provide the transaction data for processing without requiring a merchant device to generate the transaction data, or may be required to request particular transaction data for the predicted purchase from merchant device 150. Transaction processing application 132 may receive a payment request from user device 110 for the transaction data by the account, which may include identifiers, tokens, or other data used for transaction processing. Transaction processing application 132 may process a payment and may provide a transaction history to user device 110 and/or merchant device 150 for transaction authorization, approval, or denial.

In various embodiments, transaction processor 130 includes other applications 134 as may be desired in particular embodiments to provide features to transaction processor 130. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI), configured to provide an interface to the user when accessing transaction processor 130, where the user or other users may interact with the GUI to more easily view and communicate information. In various embodiments, other applications 134 may include additional connection and/or communication applications, which may be utilized to communicate information to over network 160.

Additionally, transaction processor 130 includes database 136. Database 136 may store various identifiers associated with user device 110. Database 136 may also store account data, including payment instruments and authentication credentials, as well as transaction processing histories and data for processed transactions. Database 136 may store received data associated with a user, such as tracked data of the user so that correlations between locations and activities may be generated. In some embodiments, one or more predicted activities, such as predicted purchases, at locations may be determined. Additionally, database 136 may store transaction data provided to user device 110.

In various embodiments, transaction processor 130 includes at least one network interface component 138 adapted to communicate user device 110 and/or another device/server for a merchant over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant device 150 may be implemented using any appropriate hardware and software configured for wired and/or wireless communication with user device 110, and/or transaction processor 130 for processing a transaction based on data generated for a predicted purchase at a location. Merchant device 150 may correspond to a merchant that provides sales through a physical merchant location, such as a location of user device 110. In other embodiments, merchant device 150 may be remote from the location of user device 110. In various embodiments, merchant device 150 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although only one merchant device is shown, a plurality of merchant devices may function similarly.

Merchant device 150 of FIG. 1 contains a sales application 152, a database 154, and a communication module 156. Sales application 152 and other applications 134 may correspond to executable processes, procedures, and/or applications with associated hardware. In other embodiments, merchant device 150 may include additional or different software as required.

Sales application 152 may correspond to one or more processes to execute modules and associated devices of merchant device 150 to provide a convenient interface to permit a merchant for merchant device 150 to enter, view, and/or process items the user wishes to purchase based on a predicted purchase of that item. In this regard, sales application 152 may correspond to specialized hardware and/or software utilized by merchant device 150 that may provide transaction processing for the predicted purchase using financial information from user device 110. Thus, sales application 140 may be implemented as an application having a user interface enabling the merchant to enter and/or view the items a user associated with user device 110 has selected for purchase (e.g., at a merchant location for the merchant, for example, items brought to a checkout register for the merchant and/or requested to be produced by the merchant). Sales application 152 may further enable the merchant to enter coupons and/or discounts for the items, edit the order including adding, removing, and/or modifying items, or other functions with regards the selected items in the purchase order. In some embodiments, the transaction data may instead be received from user device 110 and/or transaction processor 130. Once the items have been finalized for purchase by the user, a total may be calculated, and a transaction may be engaged with the user to complete payment for the selected items, for example, through tokenized data or other information from user device 110. Thus, sales application 152 may request and receive payment covering the selected items from the user. Sales application 152 may alert the merchant when payment for the transaction for the item(s) is completed and may provide a transaction history to sales application 152 for generating a receipt to the user associated with user device 110.

Merchant device 150 may further include database 154 which may include, for example, identifiers such as operating system registry entries, cookies associated with sales application 152 and/or other applications 134, identifiers associated with hardware of merchant device 150, or other appropriate identifiers. Identifiers in database 154 may be used by a payment/service provider to associate merchant device 150 with a particular account maintained by the payment/service provider. Database 154 may also further store received transaction data, as well as data for determining predicted purchases, such as past completed transactions, inventory information, sales and discounts, and the like.

Merchant device 150 includes at least one communication module 156 adapted to communicate with user device 110 and/or transaction processor 130 over network 160. In various embodiments, communication module 156 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
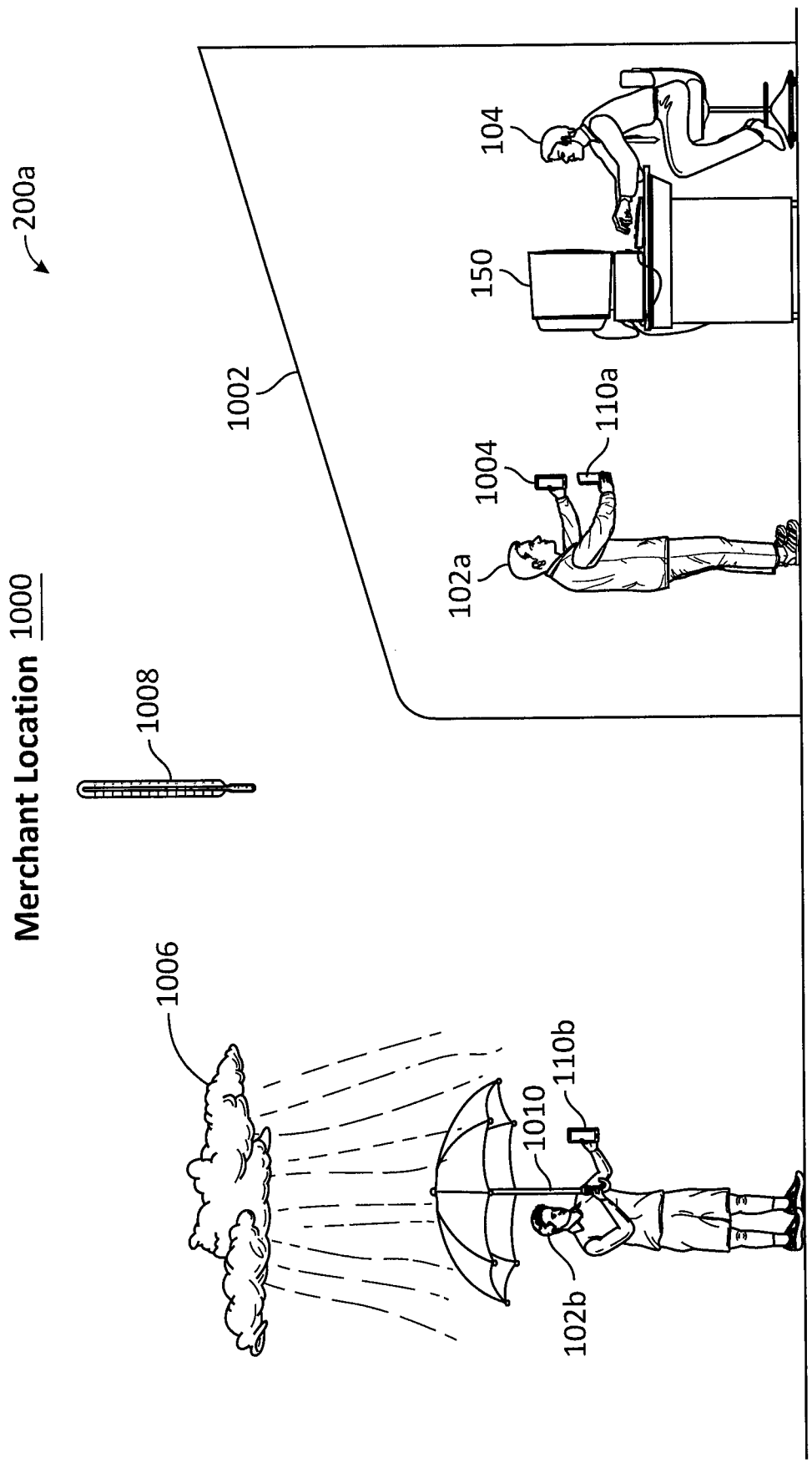
FIG. 2A is an exemplary real-world environment where multiple users may receive presentations of device data on mobile devices based on past activities and data of those users, according to an embodiment.

FIG. 2A is an exemplary real-world environment where multiple users may receive presentations of device data on mobile devices based on past activities and data of those users, according to an embodiment. Environment 200a of FIG. 2A includes a user device 110a and a user device 110b similar to user device 110 discussed in reference to system 100 of FIG. 1. In this regard, user device 110a and user device 110b may be used to track user activities at locations and present application data based on these user activities to users at locations visited by the user.

For example, a merchant location 1000 may include a storefront 1002 where a merchant may sell goods, services, and other items to users. A user 102a may utilize user device 110a at merchant storefront 1002 to engage in some activities, including electronic transaction processing. In past visits to merchant location 1000, user 102a may have utilized user device 110a to purchase an item 1004, such as food or beverages at storefront 1002, items in a shopping list, or other items that may be purchased. User device 110a may have further been used to perform electronic transaction processing for item 1004 during one or more of these previous visits to merchant location 1000. This may cause a service provider to predict that user 102a's visit to merchant location 1000 (which also includes a merchant location of a different merchant offering the same or similar items or services) is correlated to performing electronic transaction processing for item 1003 using user device 110a. In further embodiments, user 102a's visit to merchant location 1000 may be correlated to the purchase of item 1004 based on other user data, such as needs of user 102a based on other activities or purchases (e.g., water before an exercise, an item on a shopping list, etc.).

Thus, the service provider may then generate application data for an application on user device 110a to perform electronic transaction processing of item 1004 at merchant location 1000. This may correspond to data automatically generated and entered to a process of the application or may correspond to an executable process and/or interface element to accept processing of a transaction for item 1004. User device 110a may then receive this data, and user 102a may process a transaction for item 1004 using user device 110a. User device 110a may communicate with merchant device 150 and/or the service provider to process the transaction. Further, a merchant 104 may view the results of transaction processing and/or engage with user 102a using merchant device 150 to process the transaction.

Similarly, a user 102b may be located at merchant location 1000 and may utilize user device 110b during performance of some activity at merchant location 1000. Merchant location 1000 is further shown as having some weather 1006, such rain and clouds, during a temperature 1008. This may cause user 102b to bring an item 1010 to merchant location 1000. Item 1010 may be detected based on information input by user 102b to user device 110b, scraped from social networking posts, messages, or other data provided by user 102b, predicted based on weather 1006, or detected using a component of user device 110b (e.g., a camera). Based on the weather 1006, temperature 1008 and/or item 1010 at merchant location 1000, a predicted purchase may be determined for user 102b, such as a purchase of a hot beverage during rain or cold weather. In other embodiments, a predicted purchase normally performed by user 102b may instead be changed or ignored during weather 1006, at temperature 1008, or with item 1010. In this regard, other information for user 102b may be utilized in determining the predicted purchase, such as weather 1006, temperature 1008, item 1010, a merchant at merchant location 1000, merchant inventory or prices for the merchant, other users at merchant location 1000 or other information that may be associated with a location but is not associated with user 102b. For example, a purchase of ice cream from merchant 104 may instead be changed to a purchase of a hot beverage or may instead not be predicted to be completed by user 102b based on these factors. The service provider may then populate any application data to user device 110b to complete the predicted purchase based on these factors.

Figure 2B:
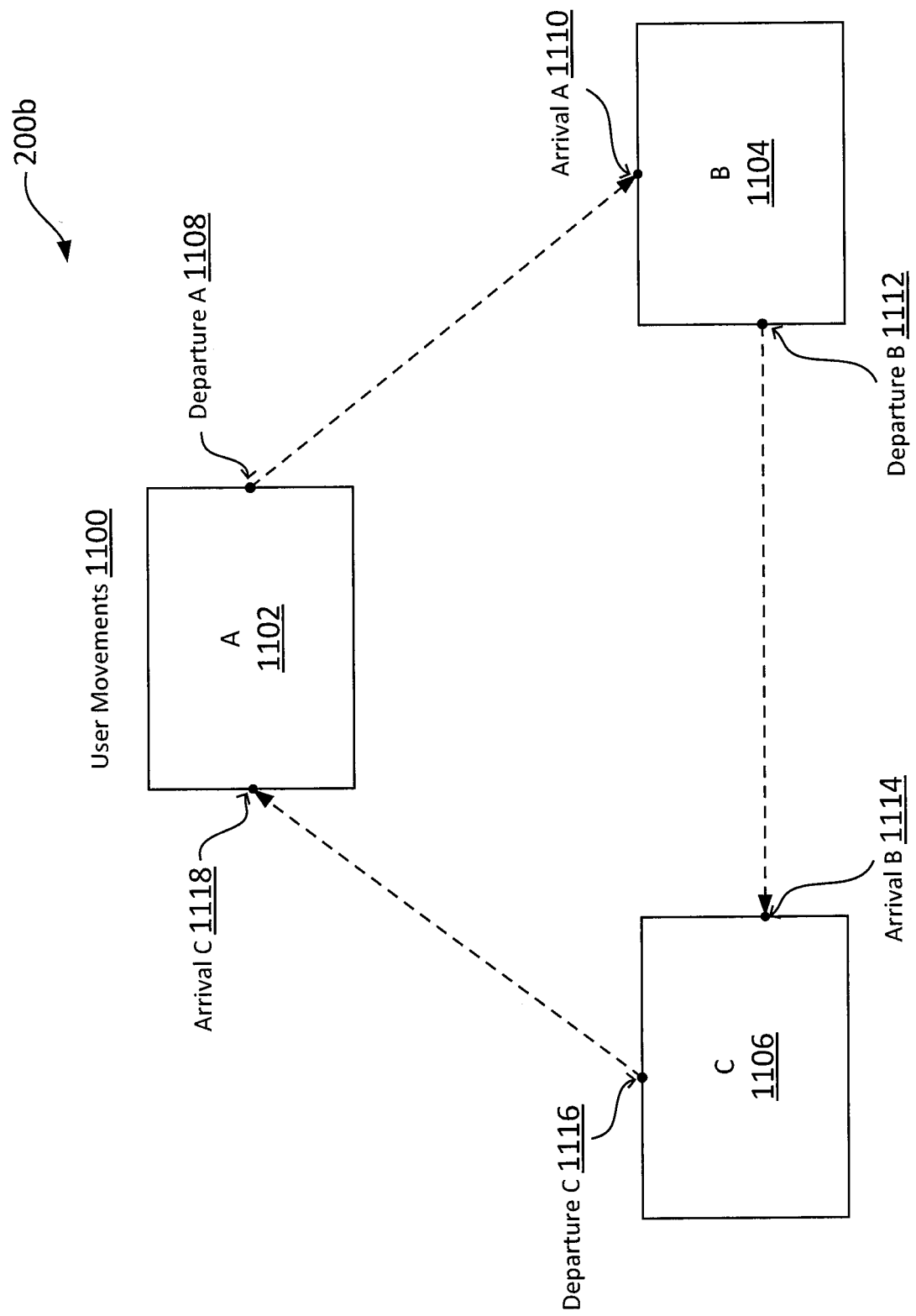
FIG. 2B is an exemplary real-world environment where a user's location-based activities and data may be tracked over a period of time, according to an embodiment.

FIG. 2B is an exemplary real-world environment where a user's location-based activities and data may be tracked over a period of time, according to an embodiment. Environment 200b includes user movements 1100 tracked over a period of time by a mobile computing device with a user, such as user device 110 in system 100 of FIG. 1. Additional activities may also be tracked at the locations visited by the user using this mobile computing device.

In this regard, a location A 1102 may be visited by a user at a time, where the user may further engage in some conduct or activities. This may include electronic transaction processing using the mobile device or may include some other activities performed by the user at the location (e.g., messaging, social networking, media viewing, shopping, etc.). The user may spend some time at the location, and then may depart at a time of departure A 1108 where the user travels to a location B 1104 and arrives at a time of arrival A 1110. This course of conduct, activities, and movements between these locations may be tracked over a period of time by a service provider. For example, the user may perform these actions of user movements 1100 every weekday, such as leaving a home location and arriving at a coffee shop to purchase an item. When arriving at location B 1104, the user may then perform some activity. For example, the user may purchase an item at a coffee shop each weekday when arriving at location B 1104.

Thereafter, the user may leave location B 1104 at a time of departure B 1112 and arrive at a location C 1106 at a time of arrival B 1114. Location C 1106 may correspond to another location visited by the user during user movements 1100, such as a work location. The user may then perform some activities at location C 1106 and leave location C 1106 at a time of departure C 1116 and arrive at location A 1102 at a time of arrival C 1118. Thus, user movements 1100 of these activities and locations visited by the user may be tracked over a period of time to make specific correlations to a likelihood of an activity occurring when the user is at one of these locations at a specific time. For example, at location C 1106 the user may perform some activities, such as purchasing items during lunch at location C 1106 on weekdays that the user is at work. A service provider may then pre-generate application data for the user's mobile device so that the user may more quickly complete processes using the mobile device without requiring the user to navigate particular menus or enter data to the mobile device.

Figure 3:
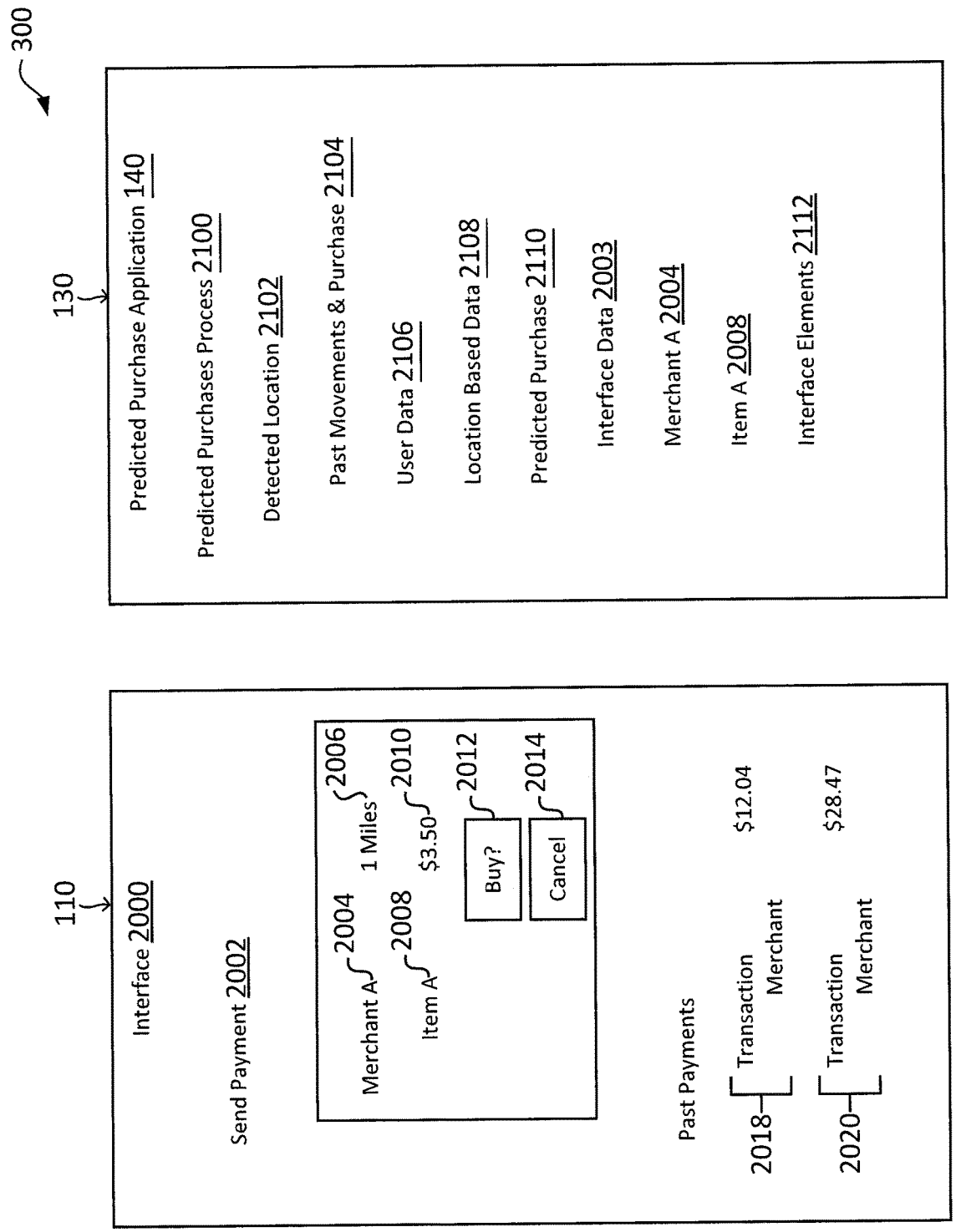
FIG. 3 is an exemplary system environment where a client device interacts with a service provider to receive specific data output on the client device based on past user activities and data, according to an embodiment.

FIG. 3 is an exemplary system environment where a client device interacts with a service provider to receive specific data output on the client device based on past user activities and data, according to an embodiment. System 300 of FIG. 3 includes user device 110 and transaction processor 130 discussed in reference to system 100 of FIG. 1.

User device 110 may display an interface 2000 for an application, such as a mobile payment application that may be used to electronic transaction processing with a merchant device at particular locations based on application data generated by predicted purchase application 140 of transaction processor 140. In this regard, predicted purchase application 140 may utilize predicted purchase process 2100 to process location data with event and activity data of a user to make correlations to predicted activities, such as predicted purchases, at locations of the user. For example, detected location 2102 may be detected through user device 110 using a GPS locator or other location detection component or process, including check-ins of the user. Detected location 2102 may be correlated to past movements and purchases 2104 of the user, such as time of visitation to detected location 2102 and past purchases performed by the user when at detected location 2102. User data 2016 may also be processed, which may include a budget of the user, other purchases by the user, needs of the user, financial information of the user, search histories or shopping lists of the user, and/or other information. Location based data 2108 may also be accessed for detected location 2102, which may include other users' purchases at detected location 2102, a merchant inventory for the merchant at detected location 2102, weather information or other contextual information for the location. Using the aforementioned data, a predicted purchase 2110 may be generated, which may be specific for the user using the tracked and available data. Predicted purchase 2110 may be generated with interface data 2003 having a purchase options or other application data to process predicted purchase 2110 to a merchant A 2004 for an item A 2008. This interface data may include interface elements 2112 that are dynamically generated and presented on user device 110 for the predicted purchase.

Transaction processor 130 may transmit the data for predicted purchase 2110 to user device 110, which may then display the data through interface 2000. In this regard, interface 2000 includes a send payment 2002 option for predicted purchase 2110 that may be displayed based on interface elements 2112. For example, interface 2000 displays interface data 2003 that shows merchant A 2004 at a distance 2006 from the user based on detected location 2102. Moreover, interface data 2003 displays item A 2008 predicted for the user for an amount 2010. Executable processes may then be displayed for an accept option 2102 or a decline option 2014. This allows the user to more quickly processes a payment for predicted purchase 2110 without the user being required to enter transaction data and/or navigate menus on user device 110. Interface 2000 may also include and/or display past payments data 2016 for a transaction history of completed transactions by the user, which may be used to determine predicted purchase 2110. This may include a transaction 2018 and/or a transaction 2020 that allows the user to review past transactions.

Figure 4:
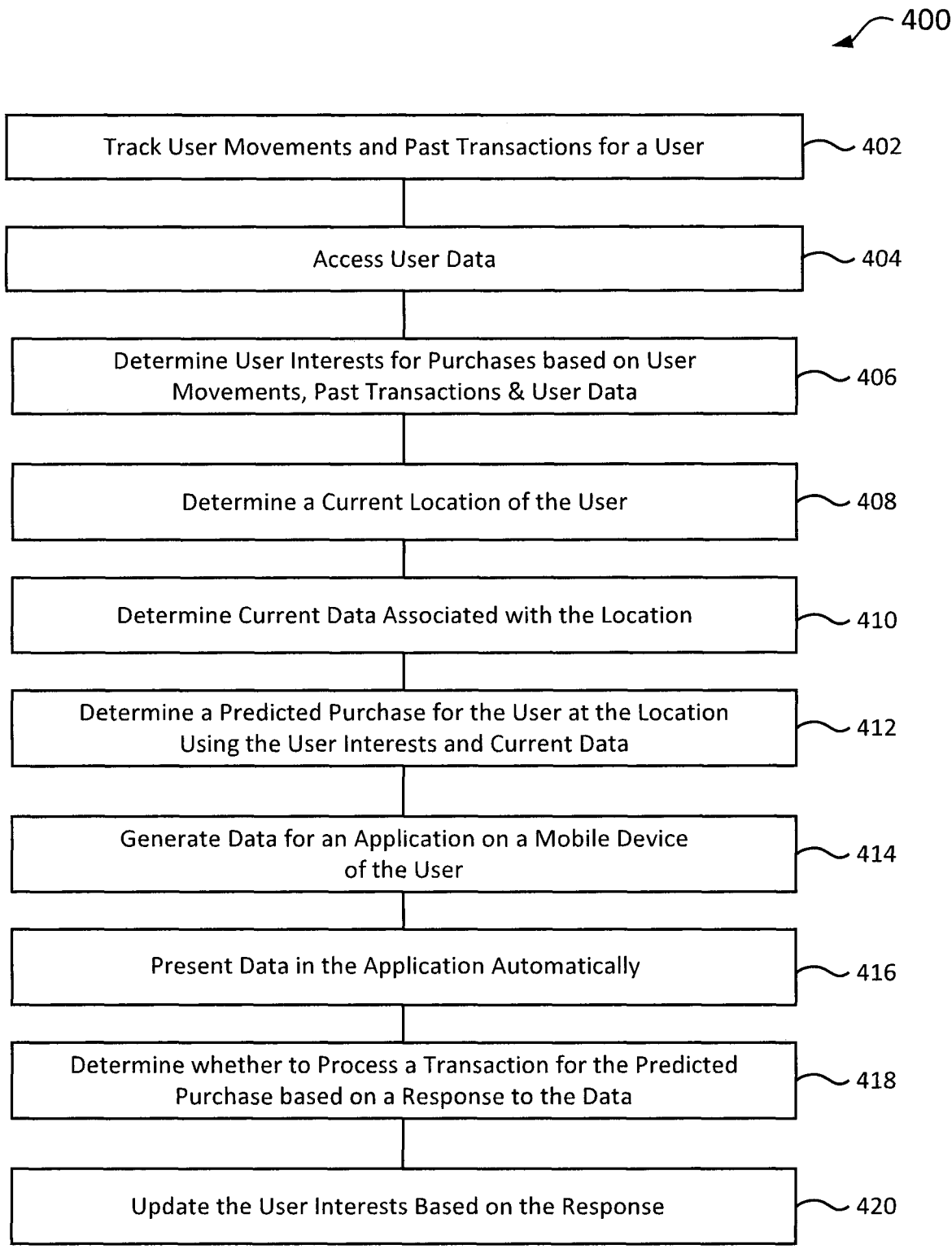
FIG. 4 is a flowchart of an exemplary process for location-based data tracking for dynamic data presentation on mobile devices, according to an embodiment.

FIG. 4 is a flowchart of an exemplary process for location-based data tracking for dynamic data presentation on mobile devices, according to an embodiment. Note that one or more steps, processes, and methods described herein of flowchart 400 may be omitted, performed in a different sequence, or combined as desired or appropriate.

At step 402 of flowchart 400, user movements and past transactions for a user are tracked over a period of time, which may be performed by a service provider and/or computing device of the user. This may include locations visited by the user and activities performed by the user at the locations, such as completed transactions for items. In addition to this tracked data, user data is accessed for the user at step 404, such as a budget of the user, needs of the user, a shopping list of the user, or other information for the user that may affect the user's activities at locations that the user may visit. Using this data, user interests for purchases are determined based on user movements, past transactions, and user data, at step 406. The user interests may correspond to user behavioral patterns of the user at a location. However, the user interests may also correspond to an be determined from other user information, such as user search histories, shopping or wish lists, or other device or online resource data retrieved for a user that corresponds to an interest of the user in purchasing an item. These user interests may correspond to repeated activities performed by the user at particular locations but may also correspond to other data that indicates a user may purchase an item at a location (e.g., a search for an item, adding an item to a shopping list, browsing items in a friend's feed or through an image posting application, etc.). The user interest in an item may also be dependent on or change based on external factors associated with the location, such as other users at the location, merchants at the location and their inventory or prices, weather at the location, and the like. For example, the user may always purchase a specific item at a location or engage in some other activity that the location that requires a purchase of an item.

Thereafter, a current location of the user is determined, at step 408. The current location may be determined through a mobile device of the user or other information, such as a check-in of the user or a schedule of the user. In some embodiments, the location may be scraped from online data of the user. Based on the current location of the user, current data associated with the location is determined at step 410, which may include weather at the location, an inventory for a merchant at the location, or other data for the location that may affect predicted purchases by the user based on the user interests. Thus, a predicted purchase for the user is determined, at step 412, using the interest and the current data. This predicted purchase may be for a potential need or desire of the user at the location for a particular item. In other embodiments, other activities of the user may be predicted, such as an action that the user may perform at the location.

Using the predicted data, application data for an application on a mobile device for the user is generated, at step 515. The application data may be used to process the predicted purchase, such as by entering data into a process of the application or providing an interface option to process a transaction. The data is then presented in the application automatically, at step 416. This is done without requiring user input or menu navigation in order to more quickly allow for processing the predicted purchase. The user may then view the option and, at step 418, it is determined whether to process a transaction for the predicted purchase based on a response to the data. The response may be a user request to process or decline the transaction. Thereafter, the user interests are updated based on the response, at step 420.

Figure 5:
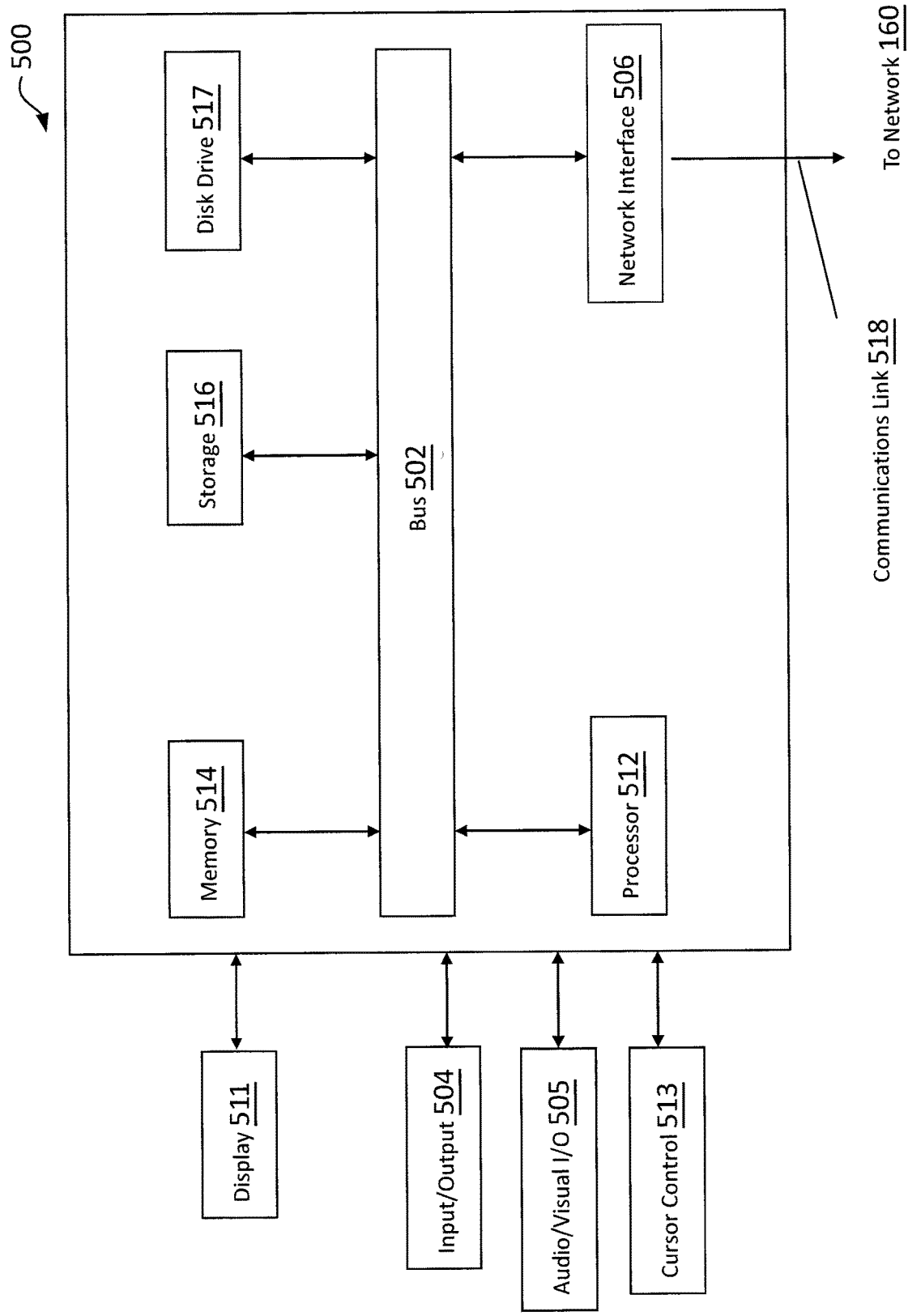
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processor coupled to the non-transitory memory and configured to execute instructions to cause the system to:
        determine an offer targeted for a user based on a current context in which the user is engaged;
        cause a user device of the user to display a notification of the offer associated with the current context in which the user is engaged, wherein the notification is associated with an application on the user device that facilitates an electronic processing of a purchase associated with the offer;
    in response to detecting a selection made via a first user interface element associated with the notification, automatically load an application interface of the application with offer data for the offer without requiring a user input of the offer data;
    automatically select a payment instrument of the user based on a payment account of the user;
    dynamically render a second user interface element in the application interface, that, upon a selection via the second user interface element, causes an initiation of the electronic processing of the purchase associated with the offer using the automatically selected payment instrument; and
    automatically input, without requiring the user input, data for the purchase associated with the offer based on the selection made via the second user interface element in the application interface.

2. The system of claim 1, wherein the current context is associated with at least one of a current activity that the user is engaged in, a biometric of the user, or a location of the user, and wherein the offer is further associated with a past activity of the user that corresponds with the current context.

3. The system of claim 1, wherein the notification includes information associated with a previous activity of the user that corresponds to the offer, and wherein executing the instructions further causes the system to:

in response to the selection made via the second user interface element, initiate an application process for the electronic processing of the purchase, wherein the second user interface element is associated with at least one of a purchase price for the purchase or a payment instrument of the user.

4. The system of claim 1, wherein, prior to determining the offer, executing the instructions further causes the system to:

determine transaction data of the user;

identify a plurality of previous activities performed by the user at one or more locations over a period of time and contextual data for the plurality of previous activities at the one or more locations from the transaction data; and determine user data of the user based at least on the plurality of previous activities and the contextual data, wherein determining the offer is further based on the user data.

5. The system of claim 4, wherein determining the user data further comprises:

scoring each of the plurality of previous activities based on a corresponding one of the one or more locations and the contextual data; and determining whether each of the scored plurality of previous activities is repeated based on the user data.

6. The system of claim 1, wherein, prior to determining the offer, executing the instructions further causes the system to:

scrape social networking data of the user from a social networking service;

identify a plurality of previous activities performed by the user at one or more locations over a period of time and contextual data for the plurality of previous activities at the one or more locations from the social networking data; and determine user data of the user based at least on the plurality of previous activities and the contextual data, wherein determining the offer is further based on the user data.

7. The system of claim 1, wherein the data for the purchase is determined from a merchant device of a merchant extending the offer and includes at least item data and a payment amount from the merchant.

8. The system of claim 1, wherein determining the offer is further based on at least one of a past purchase associated with the user at a visited location by the user, a digital content viewed by the user, or a digital shopping list associated with the user, and wherein the current context is associated with a merchant within a distance to a current location of the user and a current activity engaged in by the user at the current location.

9. A method comprising:

identifying that a user is within a distance to a merchant at a current time;

targeting an offer to the user based on the merchant and contextual information for an activity that the user is engaged in at the current time;

causing a user device of the user to display a notification of the offer, wherein the notification is associated with an application on the user device that facilitates an electronic processing of a purchase associated with the offer;

in response to detecting a selection of a first user interface element associated with the notification, automatically loading an application interface of the application with offer data for the offer without requiring a user input of the offer data;

automatically selecting a payment instrument of the user based on a payment account of the user;

dynamically rendering a second user interface element that causes, upon a selection via the second user interface element, an initiation of the electronic processing of the purchase associated with the offer with the merchant using the automatically selected payment instrument; and automatically inputting, without requiring the user input, data for the purchase associated with the offer based on the selection made via the second user interface element in the application interface.

10. The method of claim 9, wherein the contextual information is associated with at least one of a biometric of the user, a schedule of the user, or a location of the user, and wherein the offer is further associated with a past activity of the user that corresponds with the contextual information.

11. The method of claim 9, wherein the notification includes information associated with a previous activity of the user that corresponds to the offer, and wherein the second user interface element is associated with at least one of a purchase price for the purchase or a payment instrument of the user.

12. The method of claim 9, wherein, prior to the identifying, the method further comprises:

determining transaction data of the user;

identifying a plurality of previous activities performed by the user at one or more locations over a period of time and contextual data for the plurality of previous activities at the one or more locations from the transaction data; and determining user data of the user based at least on the plurality of previous activities and the contextual data, wherein the targeting the offer is further based on the user data.

13. The method of claim 12, wherein the determining the user data further comprises:

scoring each of the plurality of previous activities based on a corresponding one of the one or more locations and the contextual data; and determining whether each of the scored plurality of previous activities is repeated based on the user data.

14. The method of claim 9, wherein, prior to the identifying, the method further comprises:

scraping social networking data of the user from a social networking service;

identifying a plurality of previous activities performed by the user at one or more locations over a period of time and contextual data for the plurality of previous activities at the one or more locations from the social networking data; and determining user data of the user based at least on the plurality of previous activities and the contextual data, wherein the targeting the offer is further based on the user data.

15. The method of claim 9, wherein the data for the purchase is determined from a merchant device of the merchant and includes at least item data and a payment amount from the merchant.

16. The method of claim 9, wherein the targeting the offer is further based on at least one of a past purchase associated with the user at a visited location by the user, a digital content viewed by the user, or a digital shopping list associated with the user, and wherein the contextual information is associated with at least one of a biometric of the user or one or more user locations of the user during the activity.

17. A non-transitory machine-readable medium having stored thereon machine-readable instructions executable to cause a machine to perform operations comprising:

identifying a merchant currently within a distance to a user while the user is engaged in a current activity;

determining at least one previous transaction of the user that is associated with an item offered by the merchant;

determining an offer targeted for the user based on the at least one previous transaction and the current activity;

causing a user device of the user to display a notification of the offer, wherein the notification is associated with an application on the user device that facilitates an electronic processing of a purchase associated with the offer;

in response to detecting a selection of a first user interface element associated with the notification, automatically loading an application interface of the application with offer data for the offer without requiring a user input of the offer data;

automatically selecting a payment instrument of the user based on a payment account of the user;

dynamically rendering a second user interface element that, upon a selection via the second user interface element, causes an initiation of the electronic processing of the purchase associated with the offer with the merchant using the automatically selected payment instrument; and automatically inputting, without requiring the user input, data for the purchase associated with the offer based on the selection made via the second user interface element in the application interface.

18. The non-transitory machine-readable medium of claim 17, wherein the determining the offer is further based on contextual information associated with the current activity, and wherein the contextual information comprises at least one of a biometric of the user or a location of the user.

* * * * *